(12) United States Patent
Wist et al.

(10) Patent No.: US 10,256,703 B2
(45) Date of Patent: Apr. 9, 2019

(54) ELECTRIC MOTOR AND METHOD OF MANUFACTURING THE ELECTRIC MOTOR

(71) Applicant: VOLKSWAGEN AKTIENGESELLSCHAFT, Wolfsburg (DE)

(72) Inventors: Alex Wist, Baunatal (DE); Mike Fippl, Baunatal (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 15/632,632

(22) Filed: Jun. 26, 2017

(65) Prior Publication Data

US 2017/0373565 A1 Dec. 28, 2017

(30) Foreign Application Priority Data

Jun. 27, 2016 (DE) .................. 10 2016 211 536

(51) Int. Cl.
*H02K 11/25* (2016.01)
*H02K 11/22* (2016.01)
*G01K 1/14* (2006.01)
*G01K 1/08* (2006.01)

(52) U.S. Cl.
CPC .............. *H02K 11/25* (2016.01); *G01K 1/08* (2013.01); *G01K 1/14* (2013.01); *H02K 11/22* (2016.01)

(58) Field of Classification Search
CPC .. H02K 1/00; H02K 5/14; H02K 5/15; H02K 3/48; H02K 17/00; H02K 3/04
USPC .................................................. 310/68 D, 71
See application file for complete search history.

(56) References Cited

U.S. PATENT DOCUMENTS

| 8,339,000 B2* | 12/2012 | Bradfield | H02K 11/33 310/68 D |
| 9,608,499 B2 | 3/2017 | Bessho et al. | |
| 2003/0016476 A1 | 1/2003 | Yamamoto et al. | |
| 2009/0224626 A1* | 9/2009 | Eppler | H02K 1/146 310/215 |
| 2011/0285220 A1 | 11/2011 | Sonohara et al. | |

(Continued)

FOREIGN PATENT DOCUMENTS

| CN | 102714432 A | 10/2012 |
| CN | 2012217303 A | 11/2012 |

(Continued)

*Primary Examiner* — Rina I Duda
(74) *Attorney, Agent, or Firm* — Laurence A. Greenberg; Werner H. Stemer; Ralph E. Locher

(57) ABSTRACT

An electric motor, particularly an engine of a motor vehicle, has a temperature sensor for monitoring the operating temperatures of a winding. The temperature sensor is inserted through a radial through-hole at the periphery of the insulation element into a recess which is delimited between a shaped-out portion on the corresponding projection of the insulation element and the winding. The shaped-out portion has a slope so that a translational displacement of the temperature sensor at the same time leads to an increase in the biasing force of the temperature sensor with respect to the winding. It is thus possible to ensure the desired pretension force, and therefore a reliable contact surface between the temperature sensor and the winding, as a result of the connecting force and, at the same time, secure the temperature sensor with force fit in the shaped-out portion.

11 Claims, 5 Drawing Sheets

(56) References Cited

U.S. PATENT DOCUMENTS

2013/0169073 A1* 7/2013 Nagahama ............... H02K 9/19
  310/43
2014/0184031 A1 7/2014 Kaneshige

FOREIGN PATENT DOCUMENTS

| | | |
|---|---|---|
| CN | 103891111 A | 6/2014 |
| CN | 104682627 A | 6/2015 |
| CN | 105698948 A | 6/2016 |
| DE | 10130982 A1 | 1/2003 |
| DE | 112009003698 T5 | 10/2012 |
| DE | 102011084229 A1 | 4/2013 |
| DE | 102013201834 A1 | 8/2014 |
| DE | 102014215916 A1 | 2/2016 |
| DE | 102014215917 A1 | 2/2016 |
| DE | 102014225978 A1 | 6/2016 |
| EP | 1278291 A2 | 1/2003 |
| EP | 1294079 B1 | 3/2006 |
| TW | 201638168 A | 11/2016 |

* cited by examiner

ELECTRIC MOTOR AND METHOD OF MANUFACTURING THE ELECTRIC MOTOR

CROSS-REFERENCE TO RELATED APPLICATION

This application claims the priority, under 35 U.S.C. §119, of German application DE 10 2016 211 536.7, filed Jun. 27, 2016; the prior application is herewith incorporated by reference in its entirety.

BACKGROUND OF THE INVENTION

Field of the Invention

The invention relates to an electric motor which may be used in particular as an engine of a motor vehicle. The motor has a winding, preferably a shaft winding, and a temperature sensor for detecting the temperature, an insulation element, in particular a disk-shaped insulation element, to which the winding is secured on a support surface formed on radial projections. The invention furthermore relates to a method for the manufacture of such an electric motor.

In electric motors, high temperatures are often produced during operation by waste heat. A local temperature increase occurs predominantly in the region of the stator, in particular in the deflection regions of the winding. In the most unfavorable cases, it can result in overheating of the electric motor and therefore damage thereto.

Various criteria, such as mechanical strength, dielectric strength and thermal transfer coefficients should be considered when selecting suitable insulation elements. Although the insulation elements used to date generally offer adequate mechanical strength and the necessary dielectric strengths, they at the same time hinder the heat transmission from the heat source, for example the winding, to the heat sink, for example into the base body, owing to their low heat transfer coefficients.

Against this background, it is already known to integrate a temperature sensor into the electric motor in order to monitor the temperature.

A casting compound or a coolant oil in the interior can impair the measurement of the temperature since, owing to the heat conductive properties of the casting compound or the coolant oil, the temperature drops significantly as the spacing from the winding or the winding head increases. The same applies to the flange, which is made from metal and can be cooled very effectively via the cooling jacket.

By way of example, German published patent application DE 101 30 982 A1 discloses a temperature sensor for a stator winding of electric motors, which is partially incorporated in the stator.

Published patent application US 2003/0016476 A1 and its counterpart European patent application EP 1 278 291 A2 describe a temperature sensor which is integrated in an electric motor and has a displaceable temperature sensor section for placing against a stator of the electric motor.

German published patent application DE 10 2014 215 916 A1 relates to a temperature sensor for determining the temperature of a stator of an electric motor by measuring a temperature-dependent resistance.

Moreover, a temperature sensor device according to German published patent application DE 10 2014 215 917 A1 which is intended for the same purpose relates to a temperature sensor arranged in a temperature sensor sheath which comprises a base adjacent to the stator winding, wherein the thermal resistance of the base is lower than the thermal resistance of the sleeve.

The various functions lead in part to contrary structural requirements, including with regard to the positioning and insulation of coil wires. The electrical insulation of the coil winding is conventionally achieved in most cases using insulating papers or by over molding the base body with plastics material.

SUMMARY OF THE INVENTION

It is accordingly an object of the invention to provide an electric motor and a manufacturing method which overcome the above-mentioned and other disadvantages of the heretofore-known devices and methods of this general type and which provides for the design of an electric motor in such a way that the temperature measurement is substantially improved; therefore, in particular, error influences can be prevented by an appropriately suitable construction. It is a further object to provide for a particularly simple manufacturing method for such an electric motor.

With the foregoing and other objects in view there is provided, in accordance with the invention, an electric motor, comprising:

an insulation element having a plurality of radial projections forming a support surface;

a winding secured on said support surface formed by said radial projections; and a temperature sensor for detecting a temperature of said winding;

said insulation element having at least one radially accessible recess formed therein for said temperature sensor, said recess being delimited on one side by a shaped-out portion of at least one of said radial projections of said insulation element and on another side by said winding.

According to the invention, therefore, an electric motor is provided in which the insulation element has at least one radially accessible recess for the temperature sensor, which is delimited on the one hand by a radial shaped-out portion on at least one of the projections of the insulation element and on the other by the winding. Therefore, for the first time, as a result of the inventive shaped-out portion of the insulation element, the temperature sensor, through the attachment of the winding, is at the same time reliably secured in its radial and axial position in the shaped-out portion with reproducible precision and an optimum heat transfer between the winding and the temperature sensor is achieved so that undesired error influences and measurement deviations can be reliably avoided. Moreover, it is therefore managed for the first time that the temperature measurement is not only carried out in a radially or axially outer edge region which is subject to a different operating temperature as a result of the increased heat dissipation, but in the interior of the winding. The wire of the winding serves here for mechanically securing the temperature sensor, wherein the shaped-out portion is dimensioned in such a way that the temperature sensor arranged therein reproduces the support surface of the other projections for the winding virtually identically in terms of the dimensions and the contour. In other words, therefore, the outer contour of the projection having the temperature sensor arranged in its shaped-out portion corresponds to that of the other projections. However, the temperature sensor is moreover also optimally protected from environmental influences as a result of its arrangement in the recess, for example so that lubricants cannot reach the temperature sensor.

A particularly advantageous embodiment of the invention is achieved in that the shaped-out portion has a ramp-shaped slope with respect to the plane of the main extent of the insulation element or the respective projection in such a way that an inwardly directed radial displacement during assembly at the same time leads to a displacement of the temperature sensor in a transverse direction to the plane of the main extent in the direction of the winding. Therefore, the securing action can thereby be further improved in that the temperature sensor is displaced even further inwards in the shaped-out portion and moved towards the winding or pressed against the winding with an increased pre-tension force.

It goes without saying that, to assist with this, it is possible to use a construction of the temperature sensor which, for its part, has a conical circumferential contour, at least in sections, so that the effect is further reinforced, wherein it is also optionally possible to dispense with the slope of the shaped-out portion. It can furthermore also be provided that, as a result of a projection reducing the shaped-out portion in terms of its cross section, a latching action is achieved by means of an undercut in the temperature sensor.

To this end, according to a further particularly preferred embodiment of the invention, the shaped-out portion has a support surface which is inclined with respect to the plane of the main extent of the insulation element, enclosing an angle between 5° and 35°, so that, during its radial connecting movement, the temperature sensor acts as a wedge and, with a low radial connecting force, a comparatively high pressing force with respect to the winding is achieved transversely to the connecting direction.

It is essentially possible to place the temperature sensor into the shaped-out portion from above so that it is enclosed in the recess through the subsequent attachment of the winding. By comparison, a configuration of the invention in which a flush through-hole corresponding to the recess is arranged at the circumference of the insulation element is particularly advantageous. The temperature sensor can thereby not only be assembled through the through-hole but also removed again, for example for servicing or repair purposes. The manufacture of the electric motor here can firstly be carried out independently of the temperature sensor using a spacer, so that otherwise possible damage to the temperature sensor during the winding is avoided. After finishing the winding a temperature sensor is inserted through the through-hole, replacing the spacer.

The insulation element here can be manufactured from different electrically insulating materials. On the other hand, a further development of the invention in which the insulation element consists of a plastics material and the necessary shaped-out portion can therefore already be incorporated in a simple manner during manufacture is particularly practical.

According to a further, likewise particularly preferred configuration of the invention, the insulation element has a plurality of radially inwardly pointing comb-like, in particular evenly distributed projections having a planar or convex support surface for the winding, around which the winding is alternately wound, wherein the respective recess is formed by a concave shaped-out portion in one of the projections. A large contact surface between the winding and the support surface, and accordingly also between the winding and the circumferential surface of the temperature sensor, is therefore achieved.

A further particularly practical embodiment of the invention is achieved in that, in the axial direction, the shaped-out portion encloses the temperature sensor in a tube-like manner over the entire circumference in a first section and merely encloses a circumferential section of the temperature sensor, in particular no more than 50%, in a second section. Thus, optimum securing of the temperature sensor in the first section is enabled in that, during the positioning, it is possible to realize an orientation of the temperature sensor over the entire circumference of the temperature sensor with very small tolerances. By contrast, an optimum contact with the winding is achieved as a result of the second section, which acts merely as a support.

The temperature sensor could be secured in the shaped-out portion with form fit by configuring the circumference accordingly. On the other hand, it is particularly practical if the temperature sensor is secured with friction or clamping fit in particular in the first section of the shaped-out portion, wherein the clamping action is effected with respect to the winding. A force-controlled assembly can be thereby effected so that, in contrast to a displacement-controlled form-fitting securing action, the desired contact in each case is ensured by an adjustable pre-tension force.

With the above and other objects in view there is also provided, in accordance with the invention, a method of manufacturing an electric motor as described above. The method comprises:

providing the insulation element with a radially accessible recess being a shaped-out portion in at least one of the radial projections;

placing a spacer in the shaped-out portion in the at least one radial projection;

forming the winding by guiding the at least one wire over comb-shaped projections and laying the winding against a contact surface of the respective projections and also against a circumferential section of the spacer; and after completing the winding on the insulation element, removing the spacer from the shaped-out portion and replacing the spacer with a temperature sensor.

In other words, the second-mentioned object is achieved by a method for manufacturing an electric motor, in which a winding is attached to an insulation element in that a wire is guided over or under comb-like projections of the insulation element according to a particular pattern and lies against a contact surface of the respective projection, wherein, prior to attaching the winding, at least one spacer is secured on at least one shaped-out portion and the winding is subsequently attached, partially including the spacer, in such a way that the wire lies against a circumferential section of the spacer and, after finishing the winding on the insulation element, the spacer is removed from the shaped-out portion and replaced by a temperature sensor. On the one hand, an undesired, possibly damage-inducing load on the temperature sensor is thereby avoided during assembly in that the temperature sensor is only arranged on the insulation element after finishing the winding and, at the same time, simplified assembly is achieved. On the other hand, however, a force-controlled connecting technique can be used so that the temperature sensor is pressed against the winding with a predetermined force. To this end, the temperature sensor is either designed to be conical in sections or is preferably substantially radially movable along a plane enclosing an acute angle with the main plane of the winding so that a radially inwardly reaching connecting movement also leads to an increasing pressing force against the winding through the displacement in the transverse direction to the plane of the main extent of the insulation element. The temperature sensor can furthermore be removed for repair or inspection purposes.

It has already proven particularly practical here if the cross section of the spacer is selected to be smaller, at least in sections, than the cross section of the temperature sensor. When connecting the temperature sensor, a clamping fit is thereby produced owing to the slightly larger cross section of the temperature sensor, which is therefore secured reliably. It is optionally possible here to also dispense with an inclined support surface of the shaped-out portion.

Other features which are considered as characteristic for the invention are set forth in the appended claims.

Although the invention is illustrated and described herein as embodied in a electric motor and method for the manufacture thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

An inventive electric motor 1, which is an engine of a motor vehicle, will be described below in more detail with reference to FIGS. 1 to 5. Undesired high temperatures occur during operation in electric motors 1 of this type, which can result in overheating of the electric motor 1 and therefore damage thereto. To monitor the temperature, the electric motor 1 is therefore equipped with a temperature sensor 3 associated with a winding 2.

Figure 1:
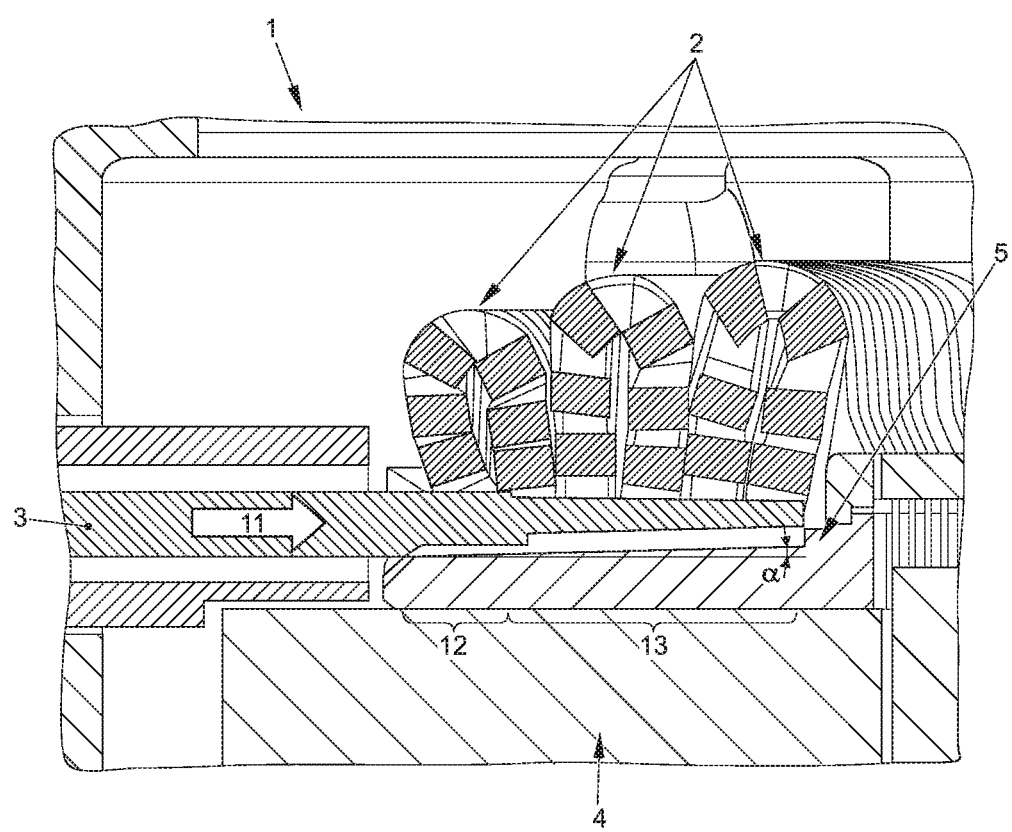
FIG. 1 is a sectional view of a detail of an electric motor according to the invention, having a temperature sensor arranged on an insulation element.
Figure 2:
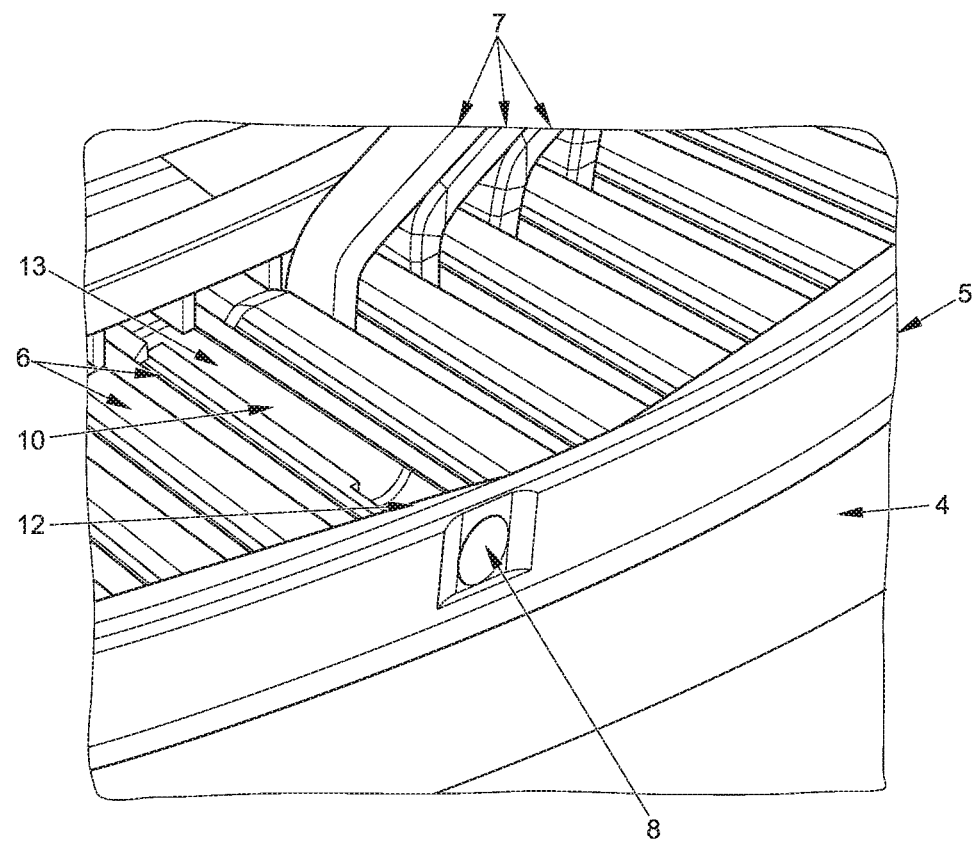
FIG. 2 is a perspective illustration of the insulation element shown in FIG. 1, without the temperature sensor.

Referring now to the figures of the drawing in detail and first, particularly, to FIGS. 1 and 2 thereof, the essential construction of the electric motor 1 comprises a laminated core 4 on which a disk-shaped insulation element 5 is arranged. The insulation element 5 has a plurality of radially inwardly pointing projections 6, which serve as carriers for the winding 2. The winding 2 is realized as a shaft winding here and comprises a plurality of wires 7 which are merely indicated.

The temperature sensor 3 is inserted through a through-hole 8 at the circumference of the insulation element 5 into a recess 9 which is delimited between the winding 2 and a shaped-out portion 10 on the corresponding projection 6 of the insulation element 5. With reference to the method of manufacturing the electric motor, the illustration of the element 3 may also represent a placeholder.

As can be seen in FIG. 1, the shaped-out portion 10 has a slope having an angle α so that a translational displacement of the temperature sensor 3 in the direction of the arrow 11 at the same time leads to an increase in the pre-tension of the temperature sensor 3 with respect to the winding 2. It is thus possible to ensure the desired pre-tension force, and therefore a reliable contact surface between the temperature sensor 3 and the winding 2, as a result of the connecting force.

Figure 3:
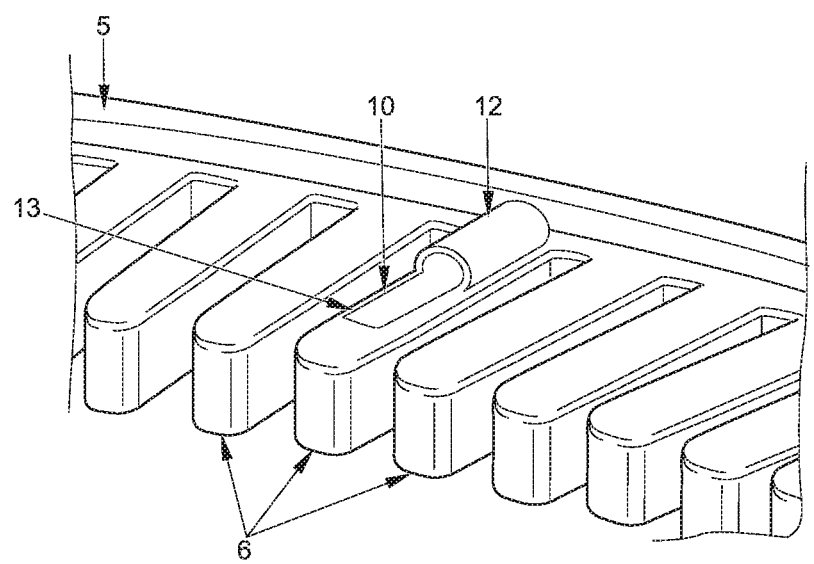
FIG. 3 is a further perspective illustration of the insulation element shown in FIG. 1, without the temperature sensor.

As illustrated in FIG. 3, in a radially outer first segment 12, the shaped-out portion 10 has a tubular form which encloses the temperature sensor 3 shown in FIG. 1 on its entire circumference. This first segment 12 adjoins a radially inner second segment 13, which merely has a concave support of the shaped-out portion 10 for the temperature sensor 3, which support is adapted to the shape of the temperature sensor 3 and merely lies against part of the circumference of the temperature sensor here. The temperature sensor 3 here is thus secured with force fit in the shaped-out portion 10 in the first section 12.

Figure 4:
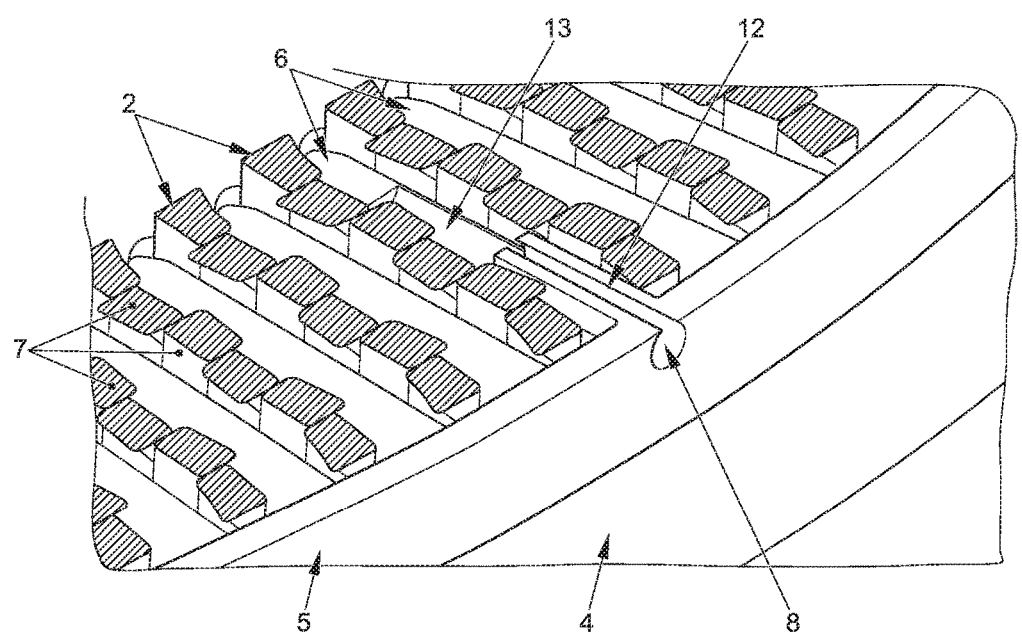
FIG. 4 is a further perspective, partially sectional illustration of the insulation element having a winding arranged thereon.
Figure 5:
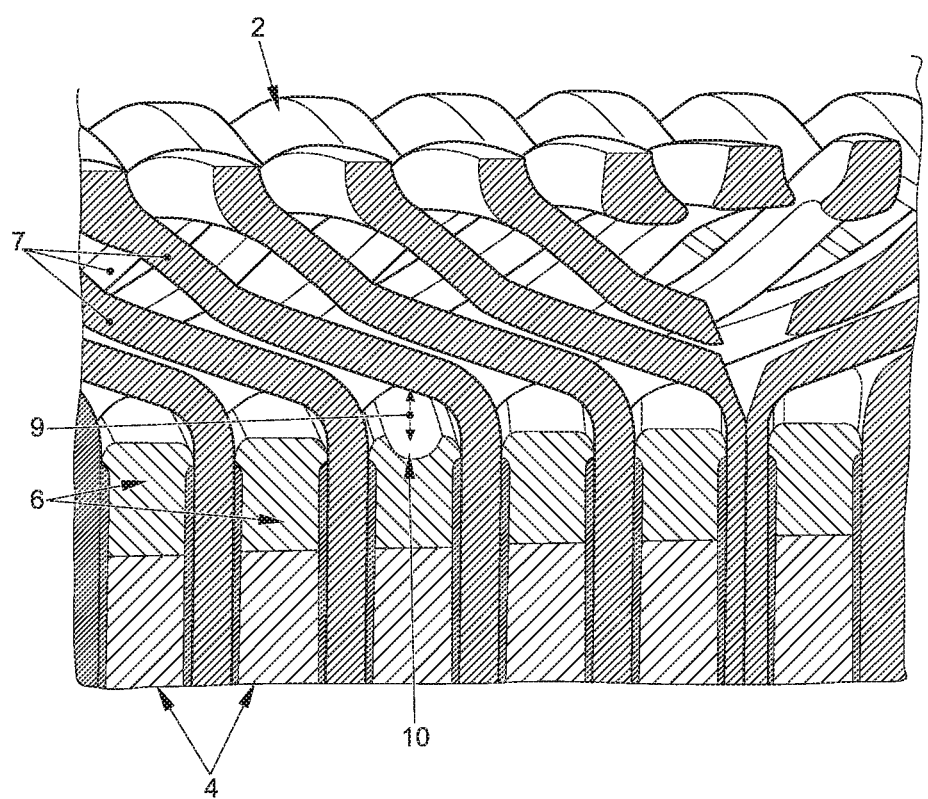
FIG. 5 is a side view of the insulation element shown in FIG. 4, having the winding arranged thereon.

The perspective view of FIG. 4 shows the insulation element in a partly sectional illustration and the winding. The insertion opening 8 for the sensor 3 is shown from the outer periphery of the device. FIG. 5 is a side view in which the insulation element 5 is shown with the winding 7. The opening 9 and the shaped-out portion 10 for the sensor 3 is illustrated as well.

The following is a summary list of reference numerals and the corresponding structure used in the above description of the invention:

1 Electric motor
2 Winding
3 Temperature sensor
4 Laminated core
5 Insulation element
6 Projection
7 Wire
8 Through-hole
9 Recess
10 Shaped-out portion
11 Direction of arrow
12 First portion, first segment
13 Second portion, second segment
α Angle

The invention claimed is:

1. An electric motor, comprising:
   an insulation element having a plurality of radial projections forming a support surface;
   a winding secured on said support surface formed by said radial projections; and
   a temperature sensor for detecting a temperature of said winding;
   said insulation element having at least one radially accessible recess formed therein for said temperature sensor, said recess being delimited on one side by a shaped-out portion of at least one of said radial projections of said insulation element and on another side by said winding.

2. The electric motor according to claim 1, configured as an engine of a motor vehicle.

3. The electric motor according to claim 1, wherein said shaped-out portion has a support surface inclined at an angle with respect to a plane of a main extent of said insulation element or the respective said projection.

4. The electric motor according to claim 1, wherein a through-hole leading to, and aligned with, said recess is formed at a circumferential periphery of said insulation element.

5. The electric motor according to claim 1, wherein said insulation element consists of a plastics material.

6. The electric motor according to claim 1, wherein said insulation element has a plurality of radially inwardly pointing projections having a planar or convex support surface for the winding, around which the winding is alternately wound, and wherein said recess is a concave shaped-out portion in one of said projections.

7. The electric motor according to claim 6, wherein, along the axial direction of said temperature sensor, said shaped-out portion has a first segment enclosing said temperature sensor over an entire circumference thereof, and a second segment lying only against a part of the circumference of said temperature sensor.

8. The electric motor according to claim 7, wherein said temperature sensor is secured with force fit in said first segment of said shaped-out portion.

9. A method of manufacturing an electric motor having an insulation element with a plurality of radial projections and a winding formed of at least one wire secured on support surfaces of the radial projections, the method which comprises:

providing the insulation element with a radially accessible recess being a shaped-out portion in at least one of the radial projections;

placing a spacer in the shaped-out portion in the at least one radial projection;

forming the winding by guiding the at least one wire over comb-shaped projections and laying the winding against a contact surface of the respective projections and also against a circumferential section of the spacer; and after completing the winding on the insulation element, removing the spacer from the shaped-out portion and replacing the spacer with a temperature sensor.

10. The method according to claim 9, which comprises radially inserting the temperature sensor into a recess between the winding and the respective projection until a force-fitting securing action is achieved.

11. The method according to claim 9, wherein a cross section of the spacer is selected to be smaller, at least in sections, than a cross section of the temperature sensor.

* * * * *